(12) United States Patent
Henderer et al.

(10) Patent No.: US 8,210,779 B2
(45) Date of Patent: Jul. 3, 2012

(54) CUTTING TAP AND METHOD OF MAKING SAME

(75) Inventors: Willard E. Henderer, Evans, GA (US);
Stephen M. George, Evans, GA (US);
Vladimir D. Volokh, Maalot (IL)

(73) Assignee: Kennametal Inc., Latrobe, PA (US)

( * ) Notice: Subject to any disclaimer, the term of this patent is extended or adjusted under 35 U.S.C. 154(b) by 918 days.

(21) Appl. No.: 12/250,570

(22) Filed: Oct. 14, 2008

(65) Prior Publication Data

US 2010/0092257 A1    Apr. 15, 2010

(51) Int. Cl.
*B23G 5/06*    (2006.01)
(52) U.S. Cl. ............... 408/222; 408/219; 470/198
(58) Field of Classification Search .......... 408/219, 408/220, 222; 470/198; *B23G 5/06*
See application file for complete search history.

(56) References Cited

U.S. PATENT DOCUMENTS

| | | | | |
|---|---|---|---|---|
| 1,447,700 A * | 3/1923 | Wells | | 408/218 |
| 1,748,962 A * | 3/1930 | Hugo | | 408/220 |
| 3,131,407 A * | 5/1964 | Roberts | | 470/204 |
| 3,661,471 A * | 5/1972 | Simonffy | | 408/220 |
| 5,112,168 A * | 5/1992 | Glimpel | | 408/220 |
| 6,217,267 B1 | 4/2001 | Sugano et al. | | |
| 6,345,941 B1 | 2/2002 | Fang et al. | | |
| 6,386,954 B2 * | 5/2002 | Sawabe et al. | | 451/48 |
| 6,499,920 B2 * | 12/2002 | Sawabe | | 408/222 |
| 6,685,573 B2 | 2/2004 | Hikosaka et al. | | |
| 6,918,718 B2 | 7/2005 | Schwarz | | |
| 7,147,413 B2 | 12/2006 | Henderer | | |
| 7,150,588 B2 | 12/2006 | Hakansson | | |
| 7,275,898 B2 | 10/2007 | Malagnino et al. | | |
| 7,665,934 B2 * | 2/2010 | Henderer et al. | | 408/222 |

(Continued)

FOREIGN PATENT DOCUMENTS

JP    59-196120 A2    11/1984

(Continued)

OTHER PUBLICATIONS

International Search Report and Written Opinion dated May 24, 2010.

*Primary Examiner* — Eric A Gates
(74) *Attorney, Agent, or Firm* — Larry R. Meenan

(57) ABSTRACT

A cutting tap includes a body having an axial forward end and an axial rearward end and a central longitudinal axis. The body has a fluted section at the axial forward end. The fluted section includes a chamfered fluted section extending from the axial forward end of the body and terminating at a first full cutting thread. The chamfered fluted section includes a first cutting thread located a first distance from the axial forward end of the body, and a second cutting thread located a second distance from the axial forward end of the body. The second distance is greater than the first distance. The chamfered fluted section is shaped such that a thickness of a section of material removed by the second cutting thread is smaller than a thickness of a section of material removed by the first cutting thread. A method of making the cutting tap is also disclosed.

16 Claims, 7 Drawing Sheets

U.S. PATENT DOCUMENTS

| | | | |
|---|---|---|---|
| 7,950,880 B2 * | 5/2011 | Henderer et al. | 408/222 |
| 2005/0271486 A1 | 12/2005 | Henderer et al. | |
| 2008/0095587 A1 | 4/2008 | Henderer et al. | |
| 2008/0095588 A1 | 4/2008 | Henderer et al. | |
| 2009/0074526 A1 * | 3/2009 | Song | 408/222 |
| 2010/0260566 A1 * | 10/2010 | Glimpel et al. | 408/222 |
| 2010/0329806 A1 * | 12/2010 | Ellis | 408/222 |
| 2011/0085867 A1 * | 4/2011 | Ellis | 408/222 |

FOREIGN PATENT DOCUMENTS

| | | | |
|---|---|---|---|
| JP | 01289615 A | * | 11/1989 |
| JP | 02106219 A | * | 4/1990 |
| JP | 2004-001103 A2 | | 1/2004 |
| JP | 2004001103 A | * | 1/2004 |
| JP | 2004314231 A | * | 11/2004 |
| SU | 730503 A | * | 4/1980 |

* cited by examiner

CUTTING TAP AND METHOD OF MAKING SAME

CROSS-NOTING TO RELATED APPLICATIONS

This Application is related to application Ser. No. 11/582,805, entitled "Cutting Tap and Method of Making Cutting Tap", filed Oct. 18, 2006, the entire contents of which are incorporated herein by reference.

BACKGROUND OF THE INVENTION

The invention relates in general to a cutting tap, and in particular to a cutting tap having a cutting edge geometry that improves the resistance of the cutting edges to chipping and fracture.

Mechanisms and machine components requiring screw threads have a long history in technology. Specifically, the application of screw threads as fastener components dominates over all other means to join parts into assemblies. Although there are many ways to generate screw threads both internal as well as external, experience has shown that taps are the favored means to generate the internal screw thread. There currently exist two tapping methods to generate internal screw threads. The dominant tapping method is by cutting and removing material from the walls of a hole to produce a helical V-shaped screw thread. Alternatively, internal screw threads can be created by displacing material to form an internal screw thread. However, tapping by cutting material is generally favored because this method requires lower torque and produces a more perfect thread form.

The dimensional accuracy of the shape and size of the internal screw thread controls the precision and fit of the screw thread assembly. Additionally, the speed of tapping affects the cost to produce an internal screw thread.

There are two materials used to manufacture cutting taps. High-speed steel is widely used for taps because of its high strength. However, cemented tungsten carbide is favored as a material for manufacturing other cutting tools over high-speed steel owing to properties such as higher hardness and high temperature stability including the ability to retain hardness at high temperatures. Typically, cutting tools manufactured from cemented carbide can be used at cutting speeds that are at least three times higher than tools manufactured from "high-speed" steel and the life of the tool is longer.

Referring now to FIGS. 9-11, there is shown one flute of a four-fluted prior art cutting tap that has a straight cutting face. In general, the cutting tap generates an internal thread form by a succession of cutting edges on the chamfered section of the tap having a length L. Material is removed from the wall of the hole until the final thread form is obtained with the first full thread on the main body of the tap. This progressive formation of an internal thread is illustrated in FIG. 9 by superimposing the sections of material removed by each of the four flutes.

As shown in FIG. 10, the prior art cutting tap has a straight cutting face that is inclined relative to a radial reference line that travels from the cutting edge at the major diameter to the center of the cutting tap at a cutting angle (or rake angle) A1. In FIG. 10, the cutting angle A1 is defined as the included angle between a line passing along the surface of the cutting face and the radial reference line. The cutting angle A1 is positive when the inclination from the radial reference line is in the counterclockwise direction as viewed in FIG. 10. The cutting angle A1 is negative when the inclination from the radial reference line is in the clockwise direction as viewed in FIG. 10.

The magnitude of the cutting angle A1 has an influence on edge strength of the prior art cutting tap. In this regard, one can increase the strength of the cutting edge by reducing the cutting angle A1 (i.e., making the cutting angle A1 more negative). However, while a reduction in the cutting angle A1 will increase the strength of the cutting edge, the amount of cutting force necessary to tap (or cut) the threads increases with the reduction in the cutting angle A1. When taps of the prior art are manufactured from cemented carbide, the cutting edges are very prone to chipping because carbide has low strength as compared to high-speed steel. Specifically, the cutting edges that are most prone to chipping are the narrow edges on the chamfer that approach and include the first full thread after the chamfer. The narrow full threads after the chamfer are also prone to chipping because they have a small included angle. The wider edges on the entry part of the chamfer are far less prone to chipping because they are not as narrow as the cutting edges of the full threads.

It should be appreciated that the above description of the obstacles connected with the cutting angle A1 of a cutting tap that has a straight cutting face also exist for a cutting tap that has an arcuate cutting face. In this regards, for a cutting tap that has an arcuate cutting face, a chordal hook angle corresponds to the rake angle A1 for the cutting tap with the straight cutting face. The chordal hook angle is defined as the angle between a radial reference line between the major diameter to the center of the cutting tap and a chord between the distal cutting edge and the minor diameter of the cutting tap.

As shown in FIG. 11, the cutting edges of the conventional cutting tap are prone to chipping, especially the narrow cutting edges on the chamfer that approach and include the first full thread after the chamfer (illustrated by the third chamfered thread in FIG. 11). The wider cutting edges on the entry part of the chamfer are less prone to chipping (illustrated by the first and second chamfered thread). Prior art taps have a chamfer defined by a single straight line at a chamfer angle A2 with respect to the axis of the tap. Because the chamfer is straight, the thickness T1 of the sections of material removed by each chamfered cutting edge remains constant.

Because taps are geometrically weak, especially the cutting edges, they are prone to chipping. Because cemented carbide has lower strength than high-speed steel, taps made from cemented carbide are more prone to chipping than taps made from high-speed steel. Therefore, it is not possible to currently use taps made from cemented carbide in some applications where high-speed steel taps can be used.

BRIEF SUMMARY OF THE INVENTION

Briefly, according to an aspect of the invention, there is provided a cutting tap comprising a body having an axial forward end and an axial rearward end and a central longitudinal axis, the body having a fluted section at the axial forward end, the fluted section including a chamfered fluted section extending from the axial forward end of the body and terminating at a first full cutting thread, the chamfered fluted section comprising a first cutting thread located a first distance from the axial forward end of the body and a second cutting thread located a second distance from the axial forward end of the body, the second distance being greater than the first distance, wherein the chamfered fluted section is shaped such that a thickness of sections of material removed by the second cutting thread is smaller than a thickness of sections of material removed by the first cutting thread.

According to another aspect of the invention, there is provided a cutting tap comprising a body having an axial forward end and an axial rearward end and a central longitudinal axis, the body having a fluted section at the axial forward end, the fluted section including a chamfered fluted section extending from the axial forward end of the body and terminating at a first full cutting thread, the chamfered fluted section comprising a first cutting thread located a first distance from the axial forward end of the body and a second cutting thread located a second distance from the axial forward end of the body, the second distance being greater than the first distance, wherein a peripheral surface of the chamfered fluted section is non-linear such that the thickness of sections of material removed by the second cutting thread is smaller than the thickness of sections of material removed by the first cutting thread.

According to yet another aspect of the invention, there is provided a cutting tap comprising a body having an axial forward end and an axial rearward end and a central longitudinal axis, the body having a fluted section at the axial forward end, the fluted section including a chamfered fluted section extending from the axial forward end of the body and terminating at a first full cutting thread, the chamfered fluted section comprising a first cutting thread located a first distance from the axial forward end of the body and a second cutting thread located a second distance from the axial forward end of the body, the second distance being greater than the first distance, wherein the first cutting thread forms a first chamfer angle with respect to the central longitudinal axis, and wherein the second cutting thread forms a second chamfer angle with respect to the central longitudinal axis, the second chamfer angle being smaller than the first chamfer angle.

According to still yet another aspect of the invention, a method of making a cutting tap comprises the steps of:
  grinding a blank to form a threaded body portion at an axially forward end of the cutting tap;
  grinding one or more flutes in the threaded body portion to form cutting edges;
  grinding the threaded body portion to form a first cutting thread and a second cutting thread, the first cutting thread at a first distance from the axially forward end of the cutting tap, and the second cutting thread at a second distance from the axially forward end of the cutting tap; and
  grinding a chamfer in the threaded body portion such that a thickness of sections of material removed from the second cutting thread is smaller than a thickness of sections of material removed from the first cutting thread during a tapping operation.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
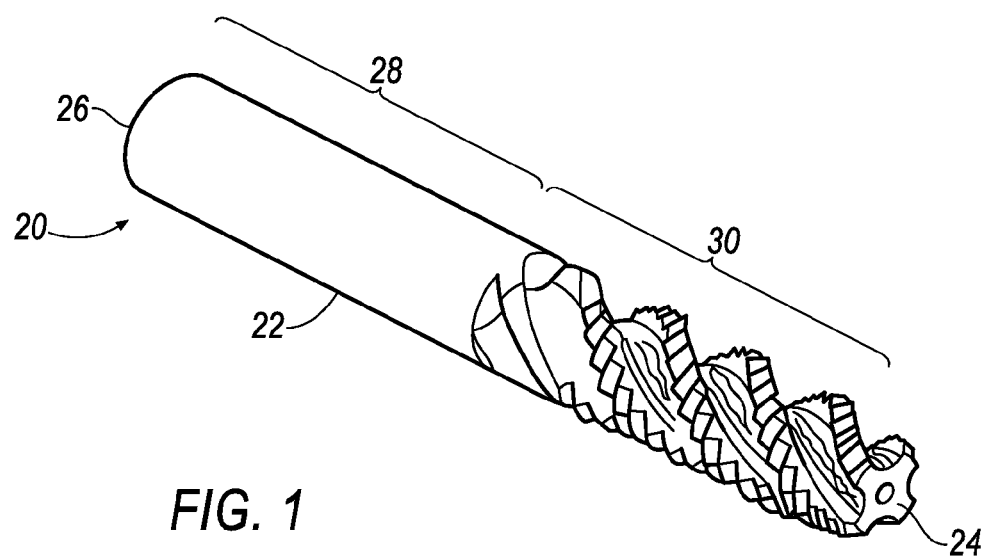
FIG. 1 is an isometric view of a exemplary embodiment of a spiral-fluted cutting tap of the invention.

Referring now to FIG. 1, a cutting tap 20 with spiral flutes is shown according to an embodiment of the invention. The cutting tap 20 has an elongate body 22 with an axial forward end 24 and an axial rearward end 26. The cutting tap 20 has a cylindrical shank portion (bracket 28) adjacent to the axial rearward end 26 and a spiral-fluted portion (bracket 30) adjacent to the axial forward end 24.

The cutting tap 20 is operatively connected to a machine tool or the like at the cylindrical shank portion 28 thereof. The spiral-fluted portion 30 has a chamfered region beginning at the axial forward end 24 and extending in an axial rearward direction therefrom. The chamfered region joins a constant diameter (or finishing) region that extends in the axial rearward direction terminating at the juncture with the cylindrical shank portion 28.

In regard to specific tapping applications, spiral flute taps with a right hand helix pull the chips out of the hole (right hand thread) and are effective in blind holes. Left hand spiral fluted taps direct the chip ahead of the tap (right hand thread) and are effective in through holes.

Figure 2:
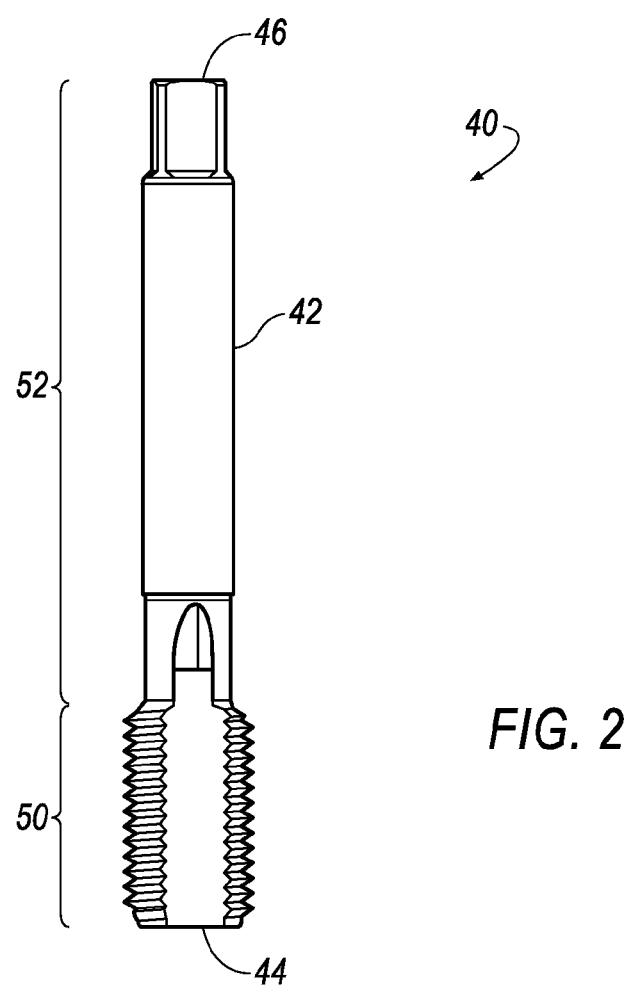
FIG. 2 is a side view of an exemplary embodiment of a straight-fluted cutting tap of the invention.

Referring now to FIG. 2, there is shown a straight-fluted cutting tap 40 according to an embodiment of the invention. The straight-fluted cutting tap 40 has an elongate body 42 with an axial forward end 44 and an axial rearward end 46. The straight-fluted cutting tap 40 has a cylindrical shank portion (bracket 52) adjacent to the axial rearward end 46 and a straight-fluted portion (bracket 50) adjacent to the axis forward end 44. In reference to a specific application, taps with straight flutes are effective in materials such as cast iron that produce a short chip.

Figure 3:
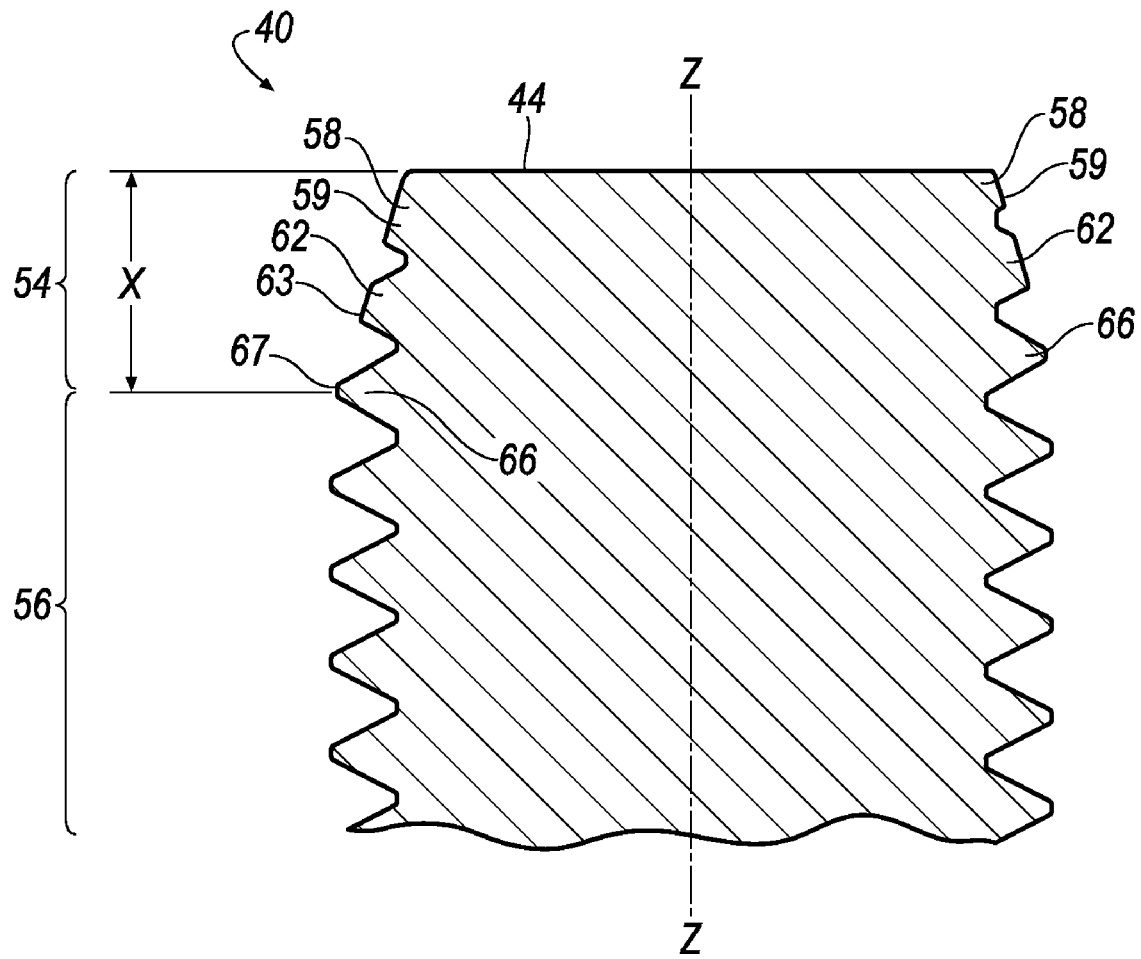
FIG. 3 is a side view showing the profile of the axial forward portion of the cutting tap of FIG. 2 including the chamfered fluted section and the junction between the chamfered fluted section and the constant diameter (or finishing) section of the cutting tap.

Referring now to FIG. 3, there is shown the axial forward portion of the straight-fluted portion 50 of the straight-fluted cutting tap 40. There is a chamfered fluted section (bracket 54) beginning at the axial forward end 44 and extending in an axial rearward direction therefrom. Chamfered fluted section 54 extends for a pre-selected distance shown by the dimension "X" in FIG. 3. The chamfered fluted section 54 terminates at the junction with a constant diameter (or finishing) fluted section (bracket 56). The constant diameter fluted section 56 begins at the junction with the chamfered fluted section 54 and extends in an axial rearward direction until it terminates at the junction with the cylindrical shank portion 52.

The chamfered fluted section 54 has a series of V-shaped cutting threads where each cutting thread has a cutting edge. The distal cutting thread 58 has a cutting edge 59 and is the most axial forward cutting thread. Distal cutting thread 58 is adjacent to cutting thread 62, which has a cutting edge 63. Cutting thread 62 is adjacent to cutting thread 66, which has a cutting edge 67. Cutting thread 66 is adjacent to cutting thread 70, which has a cutting edge 71. It will be appreciated that the constant diameter (or finishing) fluted section 56 begins with the cutting thread 66 and extends in the axial rearward direction therefrom until its junction with the cylindrical shank portion 52.

The chamfered cutting edge 59 of the distal cutting thread 58 is the strongest of the cutting threads because it is wider than, and not as narrow as, the cutting edges of the other cutting threads (for example, the cutting edges 63 and 67 of cutting threads 62 and 66, respectively).

Reducing the thickness of the sections (thickness times the width) of material removed by each cutting edge of chamfered fluted section 54 can reduce the forces imposed on the weaker cutting edges approaching the first full thread 66. One common way to accomplish this is to lengthen the dimension "X" of chamfered fluted section 54. But there are many applications, especially when tapping blind holes, where the clearance at the bottom of the hole is limited and therefore the dimension "X" of chamfered fluted section 54 cannot be increased. It is desirable to reduce the dimension "X" of the chamfered fluted section 54 even on taps for through holes in order to keep the distance the tap must travel to a minimum.

According to the principles of the invention, the cutting tap 40 has greater resistance to chipping by reducing the forces imposed on the relatively narrower cutting edges of the chamfered fluted section 54 that approach and include the first full cutting thread 66. In general, the principles of the invention are accomplished by shaping the chamfered fluted section 54 such that the thickness of the sections of material removed by the cutting edges approaching the first full cutting thread 66 is smaller than the thickness of the sections of material removed by the relatively wider cutting edges of the most axial forward cutting threads of the chamfered fluted section 54. Only the cutting tap 40 will be discussed below for brevity, however it will be understood that the principles of the invention can also be applied to the cutting tap 20.

Figure 4:
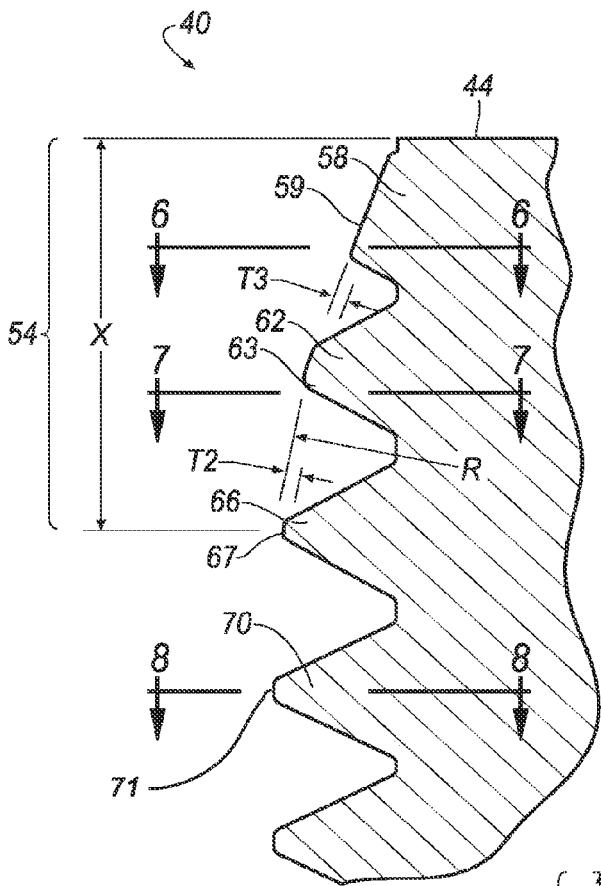
FIG. 4 is an enlarged view of the left side (as viewed in FIG. 3) of the side view of FIG. 3 illustrating an exemplary embodiment in which the outer periphery of the cutting teeth of the chamfered fluted section is formed with a radius R.

The principles of the invention described above can be accomplished by many different embodiments. Referring now to FIG. 4, one embodiment of the invention that accomplishes the principles of the invention is to form the peripheral surface of the chamfered fluted section 54 of the cutting tap 40 on a non-linear, curved line. For example, the peripheral surface of the chamfered fluted section 54 may be having a radius, R. The shape of the curved line is such that the thickness T2 of the sections of material removed by the cutting edge 67 approaching the first full cutting thread 66 is smaller than the thickness T3 of the sections of material removed by the wider cutting edges 59, 63 of the most axial forward cutting threads 58, 62. Therefore, the force on the cutting edges approaching the first full cutting thread 66 will be reduced and the likelihood of chipping reduced. The radius R of the curved line may vary along the curve in order to accomplish the principles of the invention.

Figure 5:
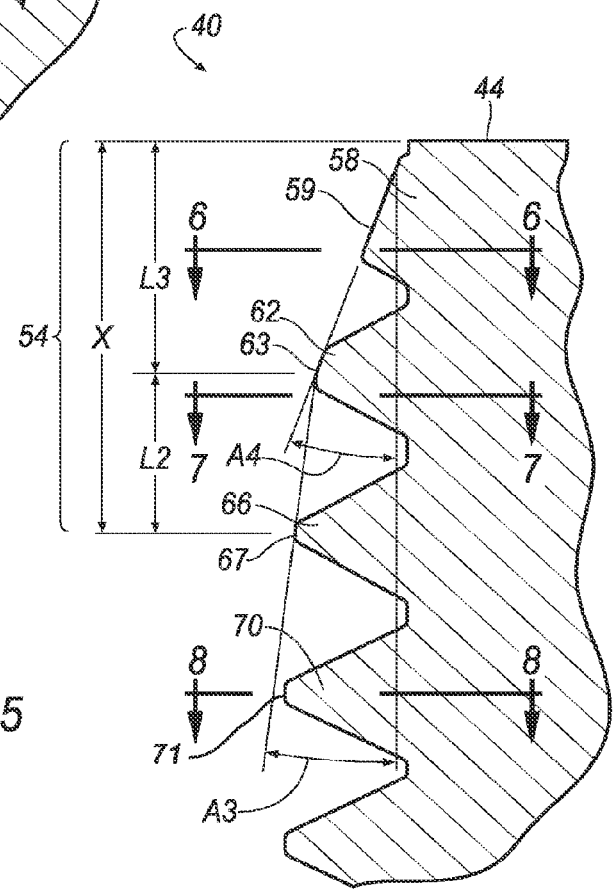
FIG. 5 is an enlarged view of the left side (as viewed in FIG. 3) of the side view of FIG. 3 illustrating an alternate exemplary embodiment in which the chamfered fluted section is formed with at least two sections having different chamfer angles.

FIG. 5 illustrates an alternative embodiment that also accomplishes the principles of the invention. In this embodiment, the chamfered fluted section 54 is formed with two or more sections formed by straight lines (dashed lines) at different chamfer angles with respect to the central longitudinal axis Z-Z of the cutting tap 40 (i.e., the chamfer angles are linear). Specifically, the chamfer angle of the last section of the chamfered fluted section 54 that approaches the first full cutting thread 66 is smaller than the chamfer angle(s) of the one or more axial forward sections of the chamfered fluted section 54. As shown in FIG. 5, for example, the chamfered fluted section 54 is composed of two sections with lengths L2 and L3 in which the last section with length L2 is formed with a chamfer angle A3 that is smaller than chamfer angle A4 of the more axial forward section with length L3. With this construction, the sections of the material removed by the cutting edges approaching the first full cutting thread 66 are smaller than the thickness of sections of material removed by the wider cutting edges on the entry part of the chamfered fluted section 54. Therefore, the force on the cutting edges approaching the first full cutting thread 66 is reduced, thereby reducing the likelihood of chipping. It will be appreciated that the invention is not limited by the number of sections of the chamfered fluted section 54 formed with different chamfer angles, and that the invention can be practiced with two or more sections of different lengths and chamfer angles, so long as the last section of the chamfered fluted section 54 that approaches the first full cutting thread 66 has a chamfer angle that is smaller than the chamfer angles of the more axial forward sections.

Figure 6:
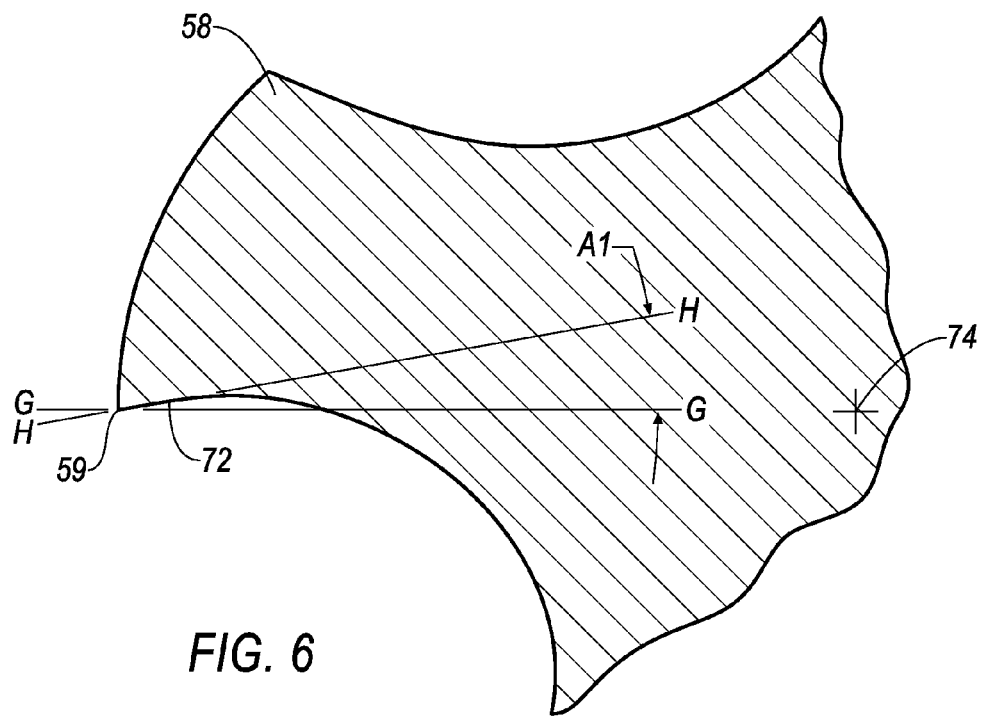
FIG. 6 is a cross-sectional view of the upper flute taken along line 6-6 of FIGS. 4 and 5.

FIG. 6 illustrates the cutting face for the cutting thread 58 in the axial forward portion of the chamfered portion 54. Here, the cutting face 72 is straight and has an orientation to present a positive cutting angle A1. Cutting angle A1 is the included angle between the radial reference line G-G (i.e., the line passing through distal cutting edge 59 and the center 74 of the cutting tap) and a line H-H that lies along the cutting face 72. The cutting angle A1 is positive because the direction of inclination of line H-H relative to line G-G is in the counterclockwise direction as view in FIG. 6. Because the cutting edges are stronger in the axial forward section of the chamfered portion 54, they can utilize a positive cutting angle, which allows for an easier cutting action.

Figure 7:
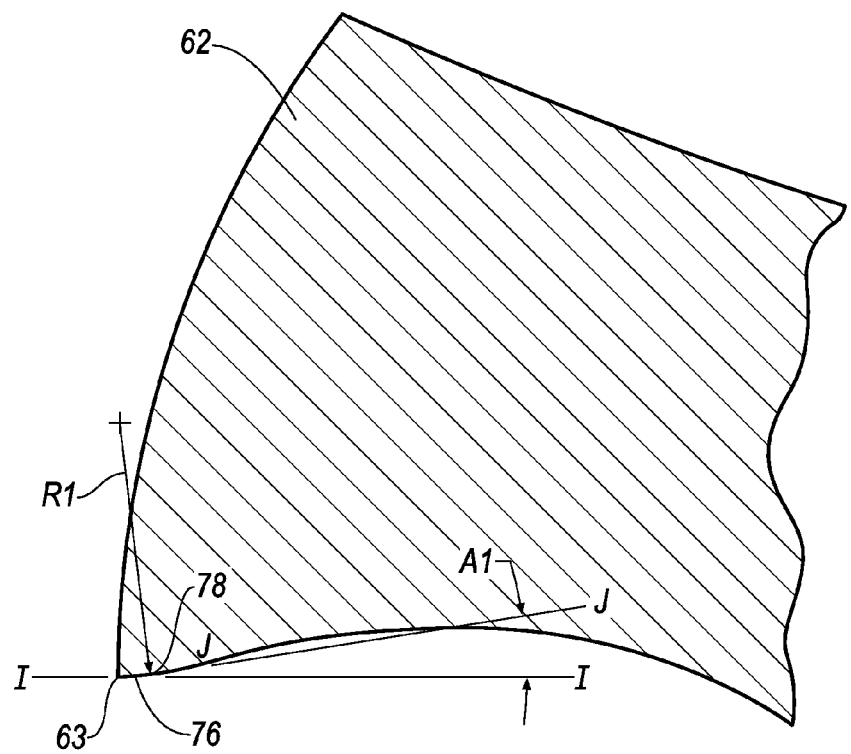
FIG. 7 is a cross-sectional view of the upper flute taken along line 7-7 of FIGS. 4 and 5.

FIG. 7 illustrates the cutting face at the cutting thread 62, which is located in a more axial rearward location than the cutting thread 58. In FIG. 7, the cutting face 76 presents a convex shape as defined by transition radius R1. The length of transition radius R1 can vary between about five percent to about one hundred percent of the diameter of the cutting tap. The cutting angle is the included angle between the radius reference line and a line (I-I) tangent to the cutting face at the distal cutting edge 63, i.e., the axial forward termination of the convex cutting face 76. Here, the cutting angle is zero degrees, and hence, only line I-I is referenced because line I-I is coextensive with the radial reference line. The convex cutting face 76 also has an axial rearward termination 78. Line J-J is a line that is tangent to the convex cutting face 76 at the axial rearward termination 76. Angle A1 is the included angle between line I-I and line J-J and is equal to the cutting angle A1 shown in FIG. 6.

Figure 8:
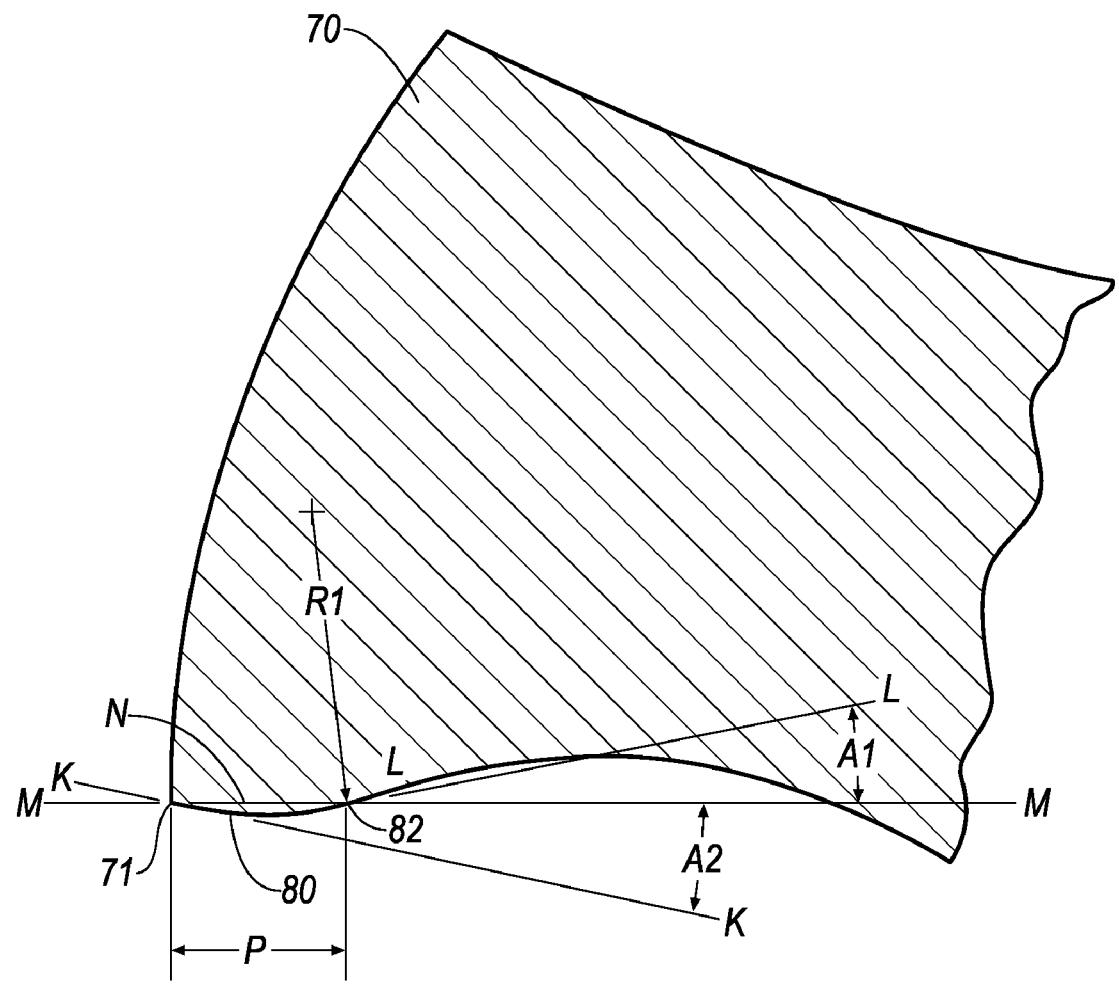
FIG. 8 is a cross-sectional view of the upper flute taken along line 8-8 of FIGS. 4 and 5.
Figure 9:
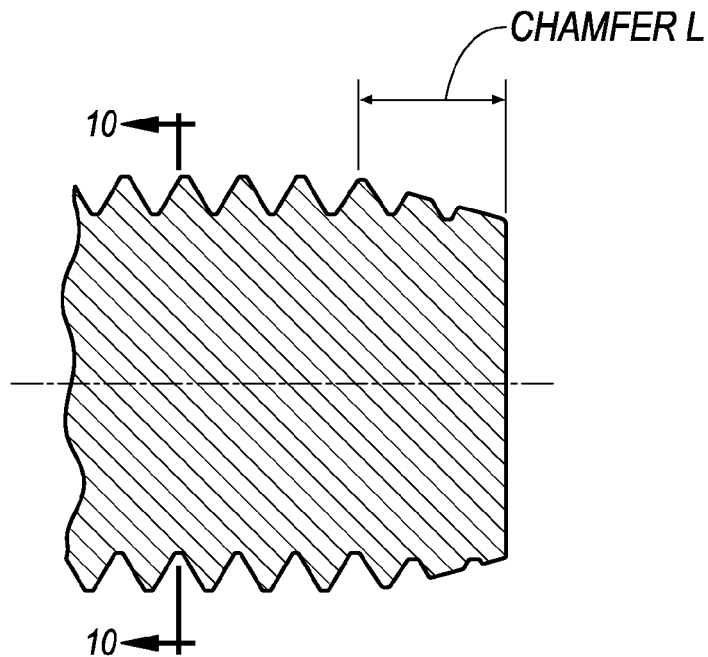
FIG. 9 is a cross-sectional view of one flute of a prior art cutting tap that has a straight cutting face.
Figure 11:
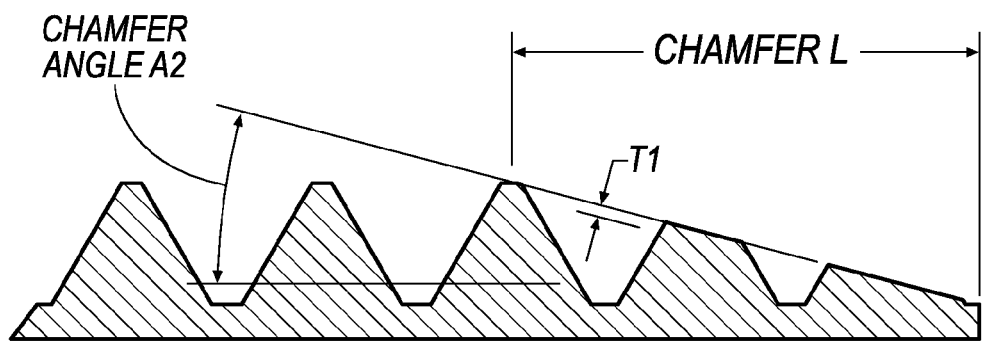
FIG. 11 is an enlarged view of the left side (as viewed in FIG. 9) of the side view of FIG. 9.

In constant diameter or finishing section of the chamfer and for threads past the chamber such as, for example, the threads 70 shown in FIG. 8, the edges of the chamfer or full threads are weaker and prone to chipping. The cutting angle A2 is reduced because the threads 70 are weaker than the more axial rearward threads. Referring to thread 70, there is a convex-shaped cutting face 80 that defines a cutting angle A2, which is the included angle between the radial reference line (M-M) and a line (K-K) tangent to the cutting face at the distal cutting edge 71. The cutting angle A2 is negative because the inclination of the line K-K relative to line M-M is in the clockwise direction as viewed in FIG. 8. It will be appreciated that the negative cutting angle compensates for the weaker thread 70 to optimize the overall tapping operation of the cutting tap. The convex cutting face 80 also has an axial rearward termination 82. Line L-L is a line that is tangent to the convex cutting face 80 at the axial rearward termination 82. Angle A1 is the included angle between line L-L and the line M-M and is equal to the cutting angle A1 shown in FIG. 6.

The movement of the center point of the transition radius R1 relative to the distal cutting edge allows a smooth transition from the positive cutting angle A1 in the axial forward section of the chamfered fluted section 54 to the negative cutting angle A2. The geometry of the cutting face as defined by the radial inward progressive movement of the center point of the constant radius (R1) relative to the distal cutting edge results in cutting angles that are in between the positive cutting angle A1 and the negative cutting angle A2. Therefore, the cutting face geometry of the inventive cutting tap is optimized to allow effective cutting angles where needed on the forward entry part of the chamfer, and chip resistant cutting edges on later finishing portions of the chamfer and threads axial rearward of the chamfer. In regard to the cutting action of the cutting tap 40, the cutting tap 40 generates an internal screw thread form by a succession of cutting edges on the chamfered section of the tap. Material is removed from the wall of the hole until the final thread form is obtained with the first full thread on the constant diameter fluted section 56. This progressive formation of an internal thread is shown in FIG. 6 by superimposing the sections of material removed by each of the four flutes.

In regard to ranges of the cutting angles, the cutting tap 40 made from cemented carbide can be effectively used when angle A1 is within the range of about 5 degrees negative to about 15 degrees positive and the angle A2 is within the range of about 0 degrees to about 25 degrees negative. The size of the radius R1 controls the transition from the cutting angle A1 to the cutting angle A2 by forming a chord between A1 and A2 that ranges in width from about 0 percent to about 80 percent of the thread height. An exemplary chord N of a length P is shown in FIG. 8.

It should be appreciated that the balance of the cutting tap flute leading to the cutting face of the cutting tap 40 can take any shape used in current practice as long as the radius of the flute is tangent to the line defined by angle A1.

Another option is to form the tap such that this profile remains constant along both the chamfer and the body of the tap past the chamfer. In this case, the cutting face angle at the cutting edges will be A2 along the entire length. As the chip is formed starting at the cutting edge and flows across the cutting face, it will be first opposed by a low cutting angle A2 that transitions through the radius R1 to a higher cutting angle A1.

In regard to the manufacture of the cutting tap, the cutting tap is manufactured from a cylindrical blank composed of high-speed steel or sintered tungsten carbide, frequently referred to as a substrate. The blank has a diameter that is sized larger than the finished dimensions of the cutting tap and is cut to length.

The first step in processing the substrate is to grind the blank to precision cylindrical tolerances by methods, such as cylindrical traverse grinding on centers or be centerless infeed grinding methods. During this step, a cylindrical shank is ground to size at the axially rearward end of the tap and the major diameter of a threaded body portion is formed at the axially forward end of the tap. Additionally during this process, or as a consequence of an additional process, an optional neck portion may be created with a cylindrical surface, and a bevel between the cylindrical shank and the neck portion. Additionally, an optional bevel may be ground on the ends of the taps by cylindrical grinding. In general, the shank diameter is approximately equal to the nominal thread diameter, but the shank diameter may be smaller than the nominal thread diameter for large diameter taps, and alternatively larger for small diameter taps. An option may be the grinding of a square as part of the shank at the extreme axially rearward end of the tap, as shown in FIG. 2.

Figure 10:
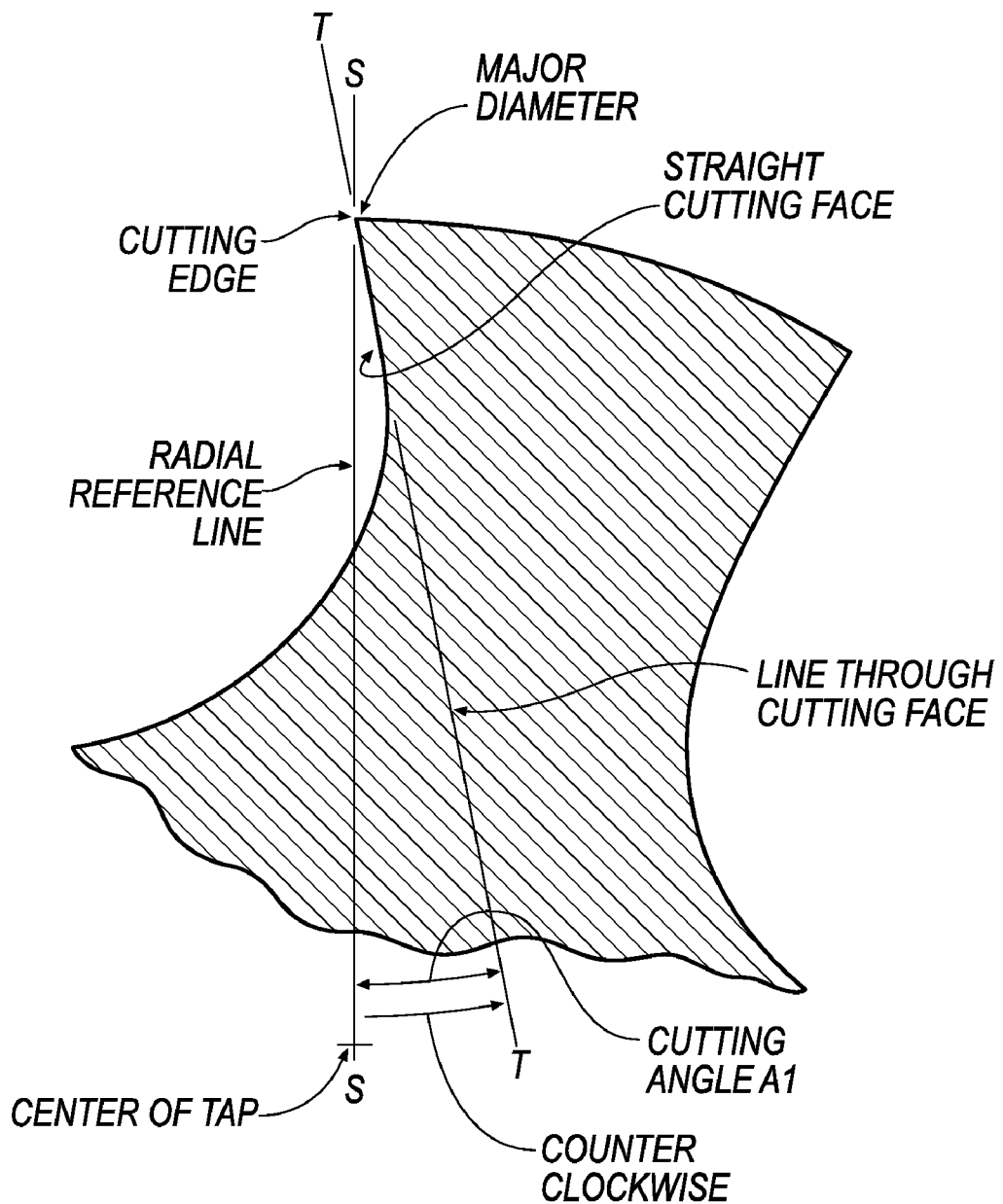
FIG. 10 is a cross-sectional view of the upper flute taken along line 10-10 of FIG. 9.

In the next step, one or more flutes are ground so as to provide cutting edges, in combination with the chamfer. The flutes may be straight or helical, either right or left hand in any combination with either right or left hand threads. As shown in FIG. 10, the cutting angle A1 may be between about 20 degrees negative for use in very hard materials to about 20 degrees positive for very ductile materials.

Alternatively, the flute may be formed with a varying cutting face angle along the length of the chamfer, as shown in FIGS. 6-8. The shape of the grinding wheel is formed so as to provide a cutting face with the selected cutting angles A1 and A2, with A1 and A2 tangent to radius R1, where A1 is more positive than A2. The balance of the flute may be shaped according to current art, as long as A1 is tangent to a radius leading to the balance of the flute. The complete form may be ground in one or two steps. For example, the flute may be ground in two steps by first grinding the flute according to current art, and then grinding the invented cutting face in a following operation. Alternatively, the wheel may be shaped so as to generate the complete form in one operation.

In the next step, the threaded body portion is ground to form the V-shaped thread flank surfaces, along with minor and major diameters, on the helix. Subsequently, the shape of a threaded cutting chamfer portion is formed by grinding. The V-shaped thread flank surfaces and major diameter replicate the internal screw thread that is generated during tapping.

The cutting chamfer portion is ground with a taper so as to allow entry in the hole to be tapped. The chamfer may be ground either to form the chamfer on a curved line as shown in FIG. 4, or by forming a chamfer with two or more sections formed by straight lines at angles to the axis of the tap such that the chamfer angle of the last section that approaches the first full cutting thread is smaller than the chamfer angle of the first section, as shown in FIG. 5. By either method, the sections of material removed by the cutting edges approaching the first full cutting thread are smaller than the thickness of sections of material removed on the entry part of the chamfer.

The length of the chamfer may be as small as one (1) thread pitch for tapping blind holes to as long as fifteen (15) thread pitches when tapping very hard materials. The number of chamfer sections each with a different angle (FIG. 5) will depend on the overall length of the chamfer and will increase in number as the overall chamfer length increases.

After the chamfer is ground, the effective cutting edge angle is A1 with the first entry portion of the chamfer and gradually progresses to cutting angle A2 in later finishing portions of the chamfer. This combination will reduce the likelihood of chipping by not only reducing the force on the cutting edges approaching the first full cutting thread, but also by increasing the strength of the same edges by reducing the cutting face angle.

After grinding, the tap may be honed with abrasive media or abrasive brushes so as to form a small radius on the cutting edges and other sharp corners. The resulting radius may be between about 0 microns and about 100 microns. This honing further increases the strength of these edges.

As a final step in the process, the tap may be optionally coated with a wear resistant layer (not shown) of metal nitrides, carbides, carbonitride, borides and/or oxides, wherein the metal is chosen from one or more of the following: aluminum, silicon and the transition metals from Groups IVa, Va and VIa of the Periodic Chart. This layer is deposited as a single monolayer or in multiple layers, including alternating layers. Low friction layers can also be deposited on top of these wear resistant layers.

As can be appreciated, the invention provides a cutting tap that allows for the use of a cemented carbide cutting tap that is not prone to chipping. The use of a cemented carbide cutting tap possesses a number of advantages as compared to a tap made of "high-speed" steel. For example, the cemented carbide cutting tap results in an improvement of the dimensional accuracy with respect to the size and shape of the threads as compared to high speed steel cutting taps. In addition, a cemented carbide cutting tap results in an increase in the useful tool life of the cutting tap as compared to high speed steel cutting taps. Further, a cemented carbide cutting tap increases the production speed for internal screw threads as compared to a high speed steel cutting tap.

The documents, patents and patent applications referred to herein are hereby incorporated by reference.

While the invention has been specifically described in connection with certain specific embodiments thereof, it is to be understood that this is by way of illustration and not of limitation, and the scope of the appended claims should be construed as broadly as the prior art will permit.

What is claimed is:

1. A cutting tap comprising a body having an axial forward end and an axial rearward end and a central longitudinal axis, the body having a fluted section at the axial forward end, the fluted section including a chamfered fluted section extending from the axial forward end of the body and terminating at a first full cutting thread, the chamfered fluted section comprising a first cutting thread located a first distance from the axial forward end of the body and a second cutting thread located a second distance from the axial forward end of the body, the second distance being greater than the first distance, wherein the chamfered fluted section is shaped such that a thickness of a section of material removed by the second cutting thread is smaller than a thickness of a section of material removed by the first cutting thread.

2. A cutting tap according to claim 1, wherein the chamfered fluted section comprises at least three cutting threads, and wherein the thickness of the section of material removed from successive cutting threads become progressively smaller as a function of distance from the axial forward end of the body.

3. A cutting tap according to claim 1, wherein a peripheral surface of the chamfered fluted section is non-linear such that the thickness of the section of material removed by the second cutting thread is smaller than the thickness of the section of material removed by the first cutting thread.

4. A cutting tap according to claim 1, wherein the first cutting thread forms a first chamfer angle with respect to the central longitudinal axis, and wherein the second cutting thread forms a second chamfer angle with respect to the central longitudinal axis, the second chamfer angle being smaller than the first chamfer angle.

5. A cutting tap according to claim 1, wherein each of the first and second cutting threads have a cutting face terminating at a distal cutting edge, the cutting face being disposed at a cutting face angle relative to a radial reference line between the distal cutting edge and the central longitudinal axis, wherein the cutting face angle of the second cutting thread is more negative than the cutting face angle of the first cutting thread.

6. A cutting tap according to claim 5, wherein the chamfered fluted section comprises at least three cutting threads, and wherein the cutting face angle of successive cutting threads is progressively more negative as a function of distance from the axial forward end of the body.

7. A cutting tap according to claim 1, wherein each of the first and second cutting threads have a cutting face terminating at a distal cutting edge, and the cutting face being defined by a transition radius having a center point, wherein the center point of the first cutting thread located at a first distance from the distal cutting edge, and wherein the center point of the second cutting thread located at a second distance from the distal cutting edge, and wherein the second distance being greater than the first distance.

8. A cutting tap comprising a body having an axial forward end and an axial rearward end and a central longitudinal axis, the body having a fluted section at the axial forward end, the fluted section including a chamfered fluted section extending from the axial forward end of the body and terminating at a first full cutting thread, the chamfered fluted section comprising a first cutting thread located a first distance from the axial forward end of the body and a second cutting thread located a second distance from the axial forward end of the body, the second distance being greater than the first distance, wherein a peripheral surface of the chamfered fluted section is non-linear such that a thickness of a section of material removed by the second cutting thread is smaller than a thickness of a section of material removed by the first cutting thread.

9. A cutting tap according to claim 8, wherein the chamfered fluted section comprises at least three cutting threads, and wherein the thickness of the section of material removed from successive cutting threads become progressively smaller as a function of distance from the axial forward end of the body.

10. A cutting tap according to claim 8, wherein each of the first and second cutting threads have a cutting face terminating at a distal cutting edge, the cutting face being disposed at a cutting face angle relative to a radial reference line between the distal cutting edge and the central longitudinal axis, wherein the cutting face angle of the second cutting thread is more negative than the cutting face angle of the first cutting thread.

11. A cutting tap according to claim 10, wherein the chamfered fluted section comprises at least three cutting threads, and wherein the cutting face angle of successive cutting threads is progressively more negative as a function of distance from the axial forward end of the body.

12. A cutting tap according to claim 8, wherein each of the first and second cutting threads have a cutting face terminating at a distal cutting edge, and the cutting face being defined by a transition radius having a center point, wherein the center point of the first cutting thread located at a first distance from the distal cutting edge, and wherein the center point of the second cutting thread located at a second distance from the distal cutting edge, and wherein the second distance being greater than the first distance.

13. A cutting tap comprising a body having an axial forward end and an axial rearward end and a central longitudinal axis, the body having a fluted section at the axial forward end, the fluted section including a chamfered fluted section extending from the axial forward end of the body and terminating at a first full cutting thread, the chamfered fluted section comprising a first cutting thread located a first distance from the axial forward end of the body and a second cutting thread located a second distance from the axial forward end of the body, the second distance being greater than the first distance, wherein the first cutting thread forms a first chamfer angle with respect to the central longitudinal axis, and wherein the second cutting thread forms a second chamfer angle with respect to the central longitudinal axis, the second chamfer angle being smaller than the first chamfer angle, wherein the chamfered fluted section comprises at least three cutting threads, and wherein a thickness of a section of material removed from successive cutting threads become progressively smaller as a function of distance from the axial forward end of the body.

14. A cutting tap according to claim 13, wherein each of the first and second cutting threads have a cutting face terminating at a distal cutting edge, the cutting face being disposed at a cutting face angle relative to a radial reference line between the distal cutting edge and the central longitudinal axis, wherein the cutting face angle of the second cutting thread is more negative than the cutting face angle of the first cutting thread.

15. A cutting tap according to claim 14, wherein the chamfered fluted section comprises at least three cutting threads, and wherein the cutting face angle of successive cutting threads is progressively more negative as a function of distance from the axial forward end of the body.

16. A cutting tap comprising a body having an axial forward end and an axial rearward end and a central longitudinal axis, the body having a fluted section at the axial forward end, the fluted section including a chamfered fluted section extending from the axial forward end of the body and terminating at a first full cutting thread, the chamfered fluted section comprising a first cutting thread located a first distance from the axial forward end of the body and a second cutting thread located a second distance from the axial forward end of the body, the second distance being greater than the first distance, wherein the first cutting thread forms a first chamfer angle with respect to the central longitudinal axis, and wherein the second cutting thread forms a second chamfer angle with respect to the central longitudinal axis, the second chamfer angle being smaller than the first chamfer angle,
wherein each of the first and second cutting threads have a cutting face terminating at a distal cutting edge, and the cutting face being defined by a transition radius having a center point, wherein the center point of the first cutting thread located at a first distance from the distal cutting edge, and wherein the center point of the second cutting thread located at a second distance from the distal cutting edge, and wherein the second distance being greater than the first distance.

* * * * *